United States Patent [19]

Kantor

[11] Patent Number: 4,975,785
[45] Date of Patent: Dec. 4, 1990

[54] PEL RESOLUTION ADDRESSING CONVERSION

[75] Inventor: Sherwood Kantor, Boulder, Colo.

[73] Assignee: International Business Machines Corporation, Armonk, N.Y.

[21] Appl. No.: 389,453

[22] Filed: Aug. 4, 1989

[51] Int. Cl.[5] .............................................. H04M 1/40
[52] U.S. Cl. ..................................... 353/447; 353/463
[58] Field of Search ............... 358/462, 447, 463, 456; 382/54

[56] References Cited

U.S. PATENT DOCUMENTS

| | | | |
|---|---|---|---|
| 4,403,257 | 9/1983 | Hsieh | 358/462 |
| 4,437,122 | 3/1984 | Walsh et al. | 358/66 |
| 4,694,342 | 9/1987 | Klees | 382/54 |

Primary Examiner—Edward L. Coles, Sr.
Attorney, Agent, or Firm—Carl M. Wright

[57] ABSTRACT

Enhancement of text characters when converted to a higher resolution without degrading imbedded halftone images. Enhancement at the higher resolution is determined by comparing predetermined patterns to individual lower resolution pels and surrounding pels. The predetermined patterns are selected as occurring in text data and not in half-tone images according to the rules described.

4 Claims, 6 Drawing Sheets

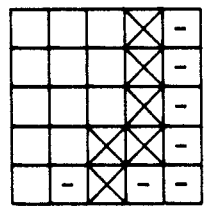
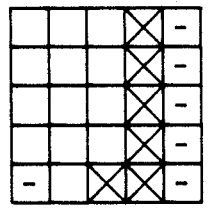
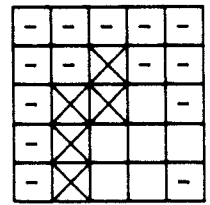
FIG.5A　　　FIG.5B　　　FIG.5C
```
 1. - - - - - - 1 - - 1 1 0 - - 1 0 0 0 - 1 0 0 - : 1 1 1 0
 2. - - - - - 1 1 1 - - 0 0 1 1 - 0 0 0 - - - 0 - - - : 1 1 0 1
 3. - 0 0 1 - 0 0 0 1 - - 0 1 1 - - - 1 - - - - - - - : 0 1 1 1
 4. - - - 0 - - - 0 0 0 - 1 1 0 0 - - 1 1 1 - - - - - : 1 0 1 1
 5. - - - - - - 1 - - - 0 1 1 - 0 0 0 1 - - 0 0 1 - : 1 1 0 1
 6. - 0 - - - 0 0 0 - - 0 0 1 1 - 1 1 1 - - - - - - : 0 1 1 1
 7. - 1 0 0 - - 1 0 0 0 - 1 1 1 - - 1 - - - - - - - : 1 0 1 1
 8. - - - - - - 1 1 1 - 1 1 0 0 - - 0 0 0 - - - 0 - : 1 1 1 0
 9. - - - - - - - 1 0 0 - - 1 0 0 - 1 0 0 0 - - 0 0 0 : 1 1 1 0
10. - - - - - - 1 - - - 0 0 1 1 - 0 0 0 0 - 0 0 0 0 - : 1 1 0 1
11. 0 0 0 - - 0 0 0 1 - 0 0 1 - - 0 0 1 - - - - - - - : 0 1 1 1
12. - 0 0 0 0 - 0 0 0 0 - 1 1 0 0 - - - 1 - - - - - - : 1 0 1 1
13. - - - - - 0 0 1 - - 0 0 1 - - 0 0 0 1 - 0 0 0 - - : 1 1 0 1
14. 0 0 0 0 - 0 0 0 0 - 0 0 1 1 - - 1 - - - - - - - - : 0 1 1 1
15. - - 0 0 0 - 1 0 0 0 - - - 1 0 0 - - 1 0 0 - - - - - : 1 0 1 1
16. - - - - - - - 1 - - 1 1 0 0 - 0 0 0 0 - 0 0 0 0 : 1 1 1 0
17. - - - - - - 0 0 0 1 1 1 0 0 1 1 0 0 0 - 1 1 - - : 0 0 0 0
18. - 1 1 - - 1 1 1 - - 1 0 1 0 - - 0 0 0 - - 0 0 0 - : 0 0 0 0
19. - - 1 1 - 0 0 0 1 1 0 0 1 1 1 0 0 0 - - - - - - - : 0 0 0 0
20. - 0 0 0 - - 0 0 0 - - 0 1 0 1 - - 1 1 1 - - 1 1 - : 0 0 0 0
21. - - - - - 0 0 0 - - 0 0 1 1 1 0 0 1 1 - - 1 1 - : 0 0 0 0
22. - 0 0 0 - - 0 0 0 - 1 0 1 0 - 1 1 1 - - - 1 1 - - : 0 0 0 0
23. - 1 1 - - 1 1 0 0 0 1 1 1 0 0 - - 0 0 0 - - - - - : 0 0 0 0
24. - - 1 1 - - - 1 1 1 - 0 1 0 1 - 0 0 0 - - 0 0 0 - : 0 0 0 0
```
FIG.10

PEL RESOLUTION ADDRESSING CONVERSION

DOCUMENTS INCORPORATED BY REFERENCE

U.S. Pat. No. 4,437,122 (Walsh et al.) is hereby incorporated by reference.

BACKGROUND OF THE INVENTION

1. Field of the Invention:

This invention relates generally to the enhancement of pel-generated (raster) displays wherein the pel resolution is increased and pels at the higher resolutions are added or deleted to take advantage of the increased resolution. It relates particularly to enhancements to displays of combined text and graphics, the latter in the form of half-tone images wherein the text is enhanced without degrading the half-tone images.

2. Description of Related Art:

Raster displays, which include CRTs and all-points-addressable (APA) printers, present information using pels, sometimes referred to as dots or pixels. Pels are small sections of an image, derived from the words "picture elements." Images and text are formed by exhibiting pels, e.g., as lighted spots on a CRT screen or as ink spots on a printer, at a certain resolution. A common resolution is 240 pels per inch. That is, each square is divided into 240-by-240 pels or a density of 57,600 pels per square inch.

Usually text characters and prepared half-tone images are positioned on a page (or bit) map at the desired location on the page in a storage device. A bit corresponds to a pel in black or white. For colors or gray scales, several bits per pel are required to specify the pel's attributes. In the following description, a bit corresponds to a pel. If the pel is to be displayed as a lighted spot or ink dot, then it has a value of logical 1 or is referred to as set and the pel is referred to as a black pel. If the pel is not to be displayed, it has a value of logical 0 or is referred to as reset, and the pel is referred to as a white pel.

When the resolution of the displayed information is to be increased, the preset characters and images can be redetermined for use at the higher resolution. Considerable effort, however, may be required to redefine the characters and images at the higher resolution. Consequently, it may be desirable to use the preset characters at the higher resolution and images designed for the lower resolution. Usually, to accomplish such a substitution, the higher resolution is made an integral multiple of the lower resolution. For example, if 240-pel characters and images are available, the higher resolution might be 480 pel per inch resolution, i.e., 230,400 pels per square inch.

In addition to the economy of not having to redefine text characters, the amount of storage for a page can be reduced. For example, an 8.5×11-inch page requires 5,385,600 bits at 240-pel resolution but 21,542,400 bits at 480-pel resolution.

Each pel at the 240-pel resolution can be replaced by four pels—a two-by-two block—of the same value at the 480-pel resolution. Such replacement, however, does not take advantage of the higher resolution. The text and images would have the same granularity. Stair-stepping, the uneven edges of a sloped line, would still be as noticeable. It is, therefore, desirable to enhance the image by replacing lower resolution pels with a pattern of higher resolution pels that reduces the stair-stepping. For example, a black pel at the lower resolution may be replaced with a pattern of three black and a white pel at the higher resolution, the position of the white pel depending on the slope of the line and which edge it depicts.

U.S. Pat. No. 4,437,122 (Walsh et al.) shows a method for enhancing slope lines or curve lines at a higher resolution three times the lower resolution. Each pel at the lower resolution is replaced by a three-by-three pattern of pels at the higher resolution, some of the pels being black, some of the pels being white, depending on certain characteristics of the line with respect to slope or curvature. This scheme has the disadvantage that, when used on information representing mixed text and halftone images, tends to degrade the halftone image while enhancing the text portion.

Gray tones in printing cannot be reproduced by varying ink density. In offset printing, graphic arts photography creates a plate negative using a halftone screen, converting continuous tone images into small, varying size dots. The dots, when printed, create an optical illusion of gray tones because, even though well defined, the individual dots are not perceived but are blended by the visual process. Larger dots produce darker gray tones than smaller dots.

In raster printing, e.g., all points addressable printers, the individual dots (pels) are the same size. The apparent dot size is varied by combining pels. Several algorithms exist to control the manner of combining pels to increase dot size, thereby creating darker gray tones.

As a result of the algorithmic process, the pels in a halftone image are very structured and nonlocalized whereas the pel patterns of text characters are less structured and more localized. The invention described and claimed herein use these differing characteristics of text and halftone images to enhance text at the higher resolution while not degrading intermixed halftone images.

SUMMARY OF THE INVENTION

In accordance with the invention, text raster or pel images are enhanced by increasing the resolution without degrading any associated or accompanying halftone images by storing pel patterns that occur or are common in text images but which do not occur or are rare in half-tone images. Sections of the raster image centered around a pel of interest are compared to the stored pel patterns. If there is a match between the compared sections and a stored pel pattern, the pel of interest is replaced with a pel pattern at the higher resolution associated with the matching stored pel pattern. If there is no match, the pel of interest is replaced with pels at the higher resolution of the same type as the pel of interest.

This invention describes a method by which good text print quality is achieved at a higher resolution converted from a lower resolution with virtually no interaction with halftone images. Prior art conversion techniques do not address the problem of halftone image interactions. Without immunity from halftone interactions, the prior art conversion methods are essentially worthless for applications where text is combined with halftone images.

BRIEF DESCRIPTION OF THE DRAWING

FIGS. 5A, 5B, and 5C are representations of five-by-five pel patterns at R pels per inch resolution with the resulting enhanced two-by-two 2R pels associated with the pel of interest.

FIG. 9 is a table of patterns to be used when the input pel of interest is a white pel.

FIG. 10 is a table of patterns to be used when the input pel of interest is a black pel.

DESCRIPTION OF THE PREFERRED EMBODIMENT

The following definitions are of terms used in the detailed description of the preferred embodiment.

A string is a sequence of characters grouped together as analogized to physical objects, e.g., beads, strung together. The individual characters are termed literals meaning that they represent only characters as opposed to symbols representing variables, numbers, or values. The latter can be operands for arithmetic operations whereas literals usually are not, but most systems make provisions for converting literals to operands. The literals comprising a string are usually delimited by quotation marks.

Subroutines are computer program modules that are not positioned in the stream of instructions in which they are used. Subroutines are invoked by call and link procedures which cause the program execution to transfer to the sequence of computer instructions comprising the subroutine program and to link or to supply the operands used by the subroutine. When a subroutine has completed execution, the program execution returns to the instruction in the calling program following the instruction which called the subroutine.

Pels (or pixels) are picture elements, usually dots, that make up a page of text or images or combinations thereof. In black and white printing, a pel having a value of 0 usually represents a white dot, i.e., absence of ink, and a pel having a value of 1 represents a black dot, i.e., a drop or dot of ink applied. Pel resolution refers to the number of dots per linear unit of square area, i.e., 240 pels means a square inch divided into 240 rows of 240 pels each for a total of 57,600 individual pels per square inch.

An input image is a string of pels representing a display area. The string is binary, 1 for black pels and 0 for white pels. The string is derived row by row. For example, the row by row input image string for the image of FIG. 4A, where the solid squares represent black pels and undefined squares are white pels, would be

```
00000000
00000000
00001100
00001100
00001100
00001100
00011000
00011000
00011000
00110000
00110000
00110000
00110000
```

The rows can be concatenated into a single string of 128 pels,

0000000000000000000011000000110000 ...
00110000.

Data strings are subsets of the input image derived as explained below in more detail.

Figure 1A:
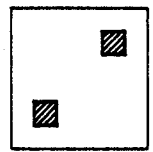
FIGS. 1A through 1S (omitting O) are successively darker half-tone dots made up of pels according to the Super Circle Rule 3 algorithm.
Figure 1B:
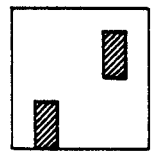
Figure 1C:
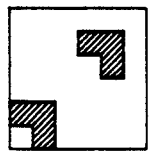
Figure 1D:
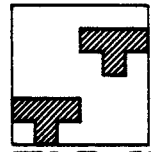
Figure 1E:
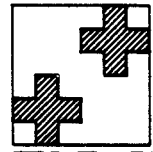
Figure 1F:
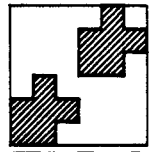
Figure 1G:
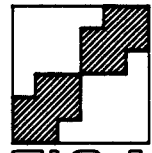
Figure 1H:
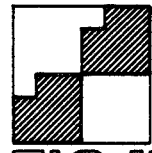
Figure 1I:
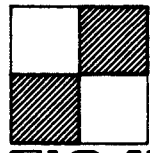
Figure 1J:
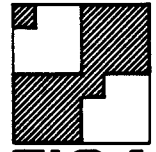
Figure 1K:
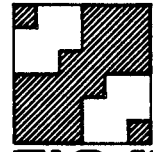
Figure 1L:
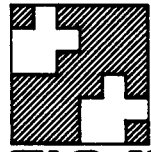
Figure 1M:
Figure 1N:
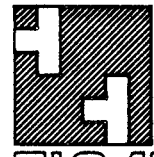
Figure 1P:
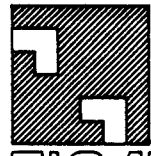
Figure 1Q:
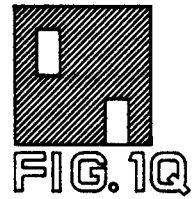
Figure 1R:
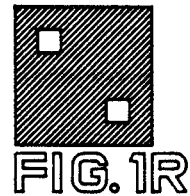
Figure 1S:
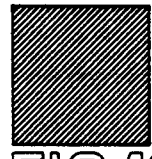

FIGS. 1A–1S (the letter "O" was omitted to prevent confusion with zero) shows a typical gradation of digital representations of halftone images using the Super Circle rule 3 algorithm. The squares in each figure represent a six-by-six pel block corresponding to the largest possible halftone dot. FIG. 1A shows the placement of black pels in the halftone dot image area for the first gray tone from white. FIG. 1B represents the next gray tone darker than shown in FIG. 1A. Subsequent FIGS. 1C–1S illustrate the pattern used to create darker and darker gray tones. Ultimately, FIG. 1S is the darkest gray tone dot inasmuch as it is completely black. In practice, the black pels, shown as small squares in FIGS. 1A–1S are more likely to be round than square as depicted in the figure.

The five-by-five pel patterns described in more detail below are selected based on the differences between the pel patterns associated with text and those associated with halftone image data. For example, isolated pels do not occur in text data but are common in halftone images. Therefore, a first rule is that an isolated pel should not be modified.

To prevent modification of the halftone image data, it is necessary to include a white pel buffer area in the area adjacent the pel of interest. The minimum size of a buffer area is determined by the arrangement of pels in the data that is not to be modified.

Figure 2:
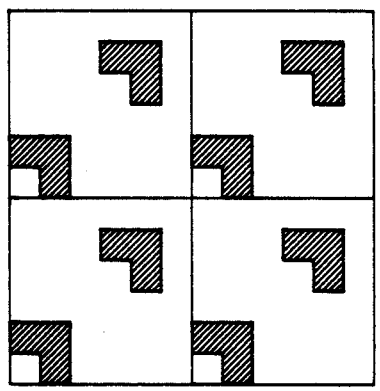
FIG. 2 is a quad arrangement of four half-tone dots.

Determination of the buffer area size is exemplified by considering the pel arrangement in FIG. 2, the halftone image pattern from FIG. 1C. The pattern of FIG. 2 shows a two-by-two dot section of a halftone image having stair step characteristics that is also found in text data.

Figure 3:
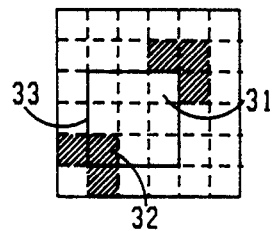
FIG. 3 is a single half-tone dot with a comparison quadrant superimposed.

FIG. 3 shows a pel of interest 31 and its proximity to other pels in the area with the buffer area 33 outlined with a solid line. To preclude modifying this pel—because it is part of a halftone image—it is necessary to identify an additional characteristic in this halftone grid that distinguishes it from text. In text, except for the intersection of lines making up a character, there is a significant amount of white space adjacent the pel of interest. A principle characteristic differentiating between text and half tone images is, therefore, the size and configuration of the white area adjacent the pel of interest. To modify the pel of interest such as pel 31, the white buffer area has to be selected so that it does not contain any black pels, e.g., pel 32 of FIG. 3. By requiring this pel to be white before modification is allowed, the halftone image is protected.

Another rule for selecting the patterns is to have a sufficient number of white pels in a surrounding quadrant.

Another additional rule is that if pels in the pattern are separated from the pel of interest by a line of black pels, these pels can be changed to don't-care values.

A further rule is that stair step patterns containing clusters of pels of the same value should be modified provided the buffer space has a sufficient number of pels of the same value as the pel of interest.

Only one quadrant need be considered and, for patterns selected in one quadrant, three additional patterns can be generated by rotating the selected pattern 90-, 180-, and 270-degrees. Other patterns can be generated using mirror images of patterns that are not symmetrical.

It is not possible to eliminate all halftone patterns using the rules because of practical limitations on pattern sizes and memory capacity. The invention, however, reduces any interaction with halftone images during enhancement to a minimum such that the image quality is virtually unaffected and unnoticeable.

Patterns for other halftone algorithms can be selected in light of the teaching of this invention. For example, protection of half-tone images created using the Super Circle rule 4 algorithm would be based on eliminating patterns having an opposite value pel in a four-by-four buffer area. For increasingly higher halftone rules, the pattern must correspondingly increase.

Protection of higher half-tone rules is not as critical as protection of the lower rules because errors at the higher rules are much less noticeable.

The application of the rules necessary to generate patterns that will differentiate between text and halftone images is seen from the tables of FIGS. 9 and 10, which are discussed in more detail below.

Figure 4A:
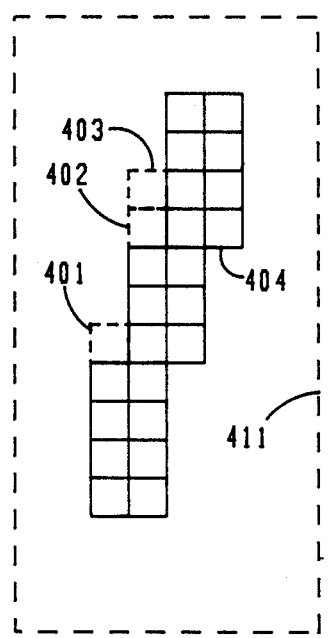
FIG. 4A is a pel arrangement representing part of a slanted line at R pels per inch resolution.

FIG. 4A represents a slanted line as it might appear in the source (lower) resolution. The solid rectangles represent black pels and nondelineated squares as well as the squares shown in dotted lines represent white pels. The area of interest is outlined with a dashed line 411 and includes an area 8 pels wide and 16 pels high, a total of 128 pels. The input image string for the area of interest is set forth above.

Figures 4B, 4C:
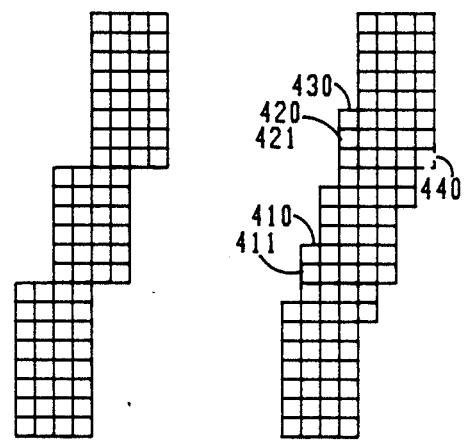
FIG. 4B is a pel arrangement resulting from a direct translation from the R pel per inch resolution to a 2R pel per inch resolution.
FIG. 4C is a version of the pel arrangement of FIG. 4B enhanced according to the invention.

Converting the source black pels to four target (higher resolution) black pels and the source white pels to four target white pels results in the shape of FIG. 4B. The step sizes are the same as in FIG. 4A so no improvement has been achieved by doubling the resolution.

FIG. 4C shows the improvement when enhanced according to the invention. The target black pel 440 has been changed to a white pel and the black pels 410, 411, 420, 421, and 430, inter alia, have been added. As a result, the stair stepping effect has been greatly reduced. The enhancement process is described below in detail.

FIG. 5A shows a five-by-five pel pattern at the source resolution with the center pel being the pel of interest and an associated two-by-two pel pattern at the target resolution. The open squares represent white pels. The squares containing crossed lines represent black pels. The squares containing dashes are don't-care pels, i.e., either black or white. Beneath the five-by-five pattern is a two-by-two pattern representing a combination of black and white pels at the target resolution which replace the center pel (input pel of interest) of the five-by-five pattern.

In the patterns of FIGS. 5A-5C, the center pels of the five-by-five patterns are referred to as the input pels of interest, denoted IPI. The other pels of the five-by-five pattern are the pels surrounding the IPI. When the IPI is surrounded by the pattern as shown in the five-by-five pattern of FIG. 5A, then the IPI is replaced in the target image by the two-by-two pattern shown beneath the five-by-five pattern.

When the white pel 401 in FIG. 4A is the IPI, then the five-by-five pattern of FIG. 5A conforms to the five-by-five pel array surrounding and including the pel 401. Therefore, the IPI is replaced by the two-by-two pattern of FIG. 5A which adds the two black pels 410 and 411 to the shape of FIG. 4C.

Similarly, the white pel 402 of FIG. 4A is replaced by the same two-by-two pattern of FIG. 5A when the pel 402 is the input pel of interest. The modified two-by-two pattern represents the black pels 420 and 421 at the target resolution in FIG. 4C.

When the white pel 403 of FIG. 4A is the IPI, then together with the surrounding pels it conforms to the five-by-five pattern shown in FIG. 5B. Replacing it with the two-by-two pattern of FIG. 5B results in the black pel 430 at the target resolution shown in FIG. 4C.

When the black pel 404 of FIG. 4A is the IPI, then it and the surrounding pels conform to the five-by-five pattern shown in FIG. 5C and it is replaced at the target resolution by the two-by-two pattern of FIG. 5C. This results in the pel 440 of FIG. 4C being a white pel at the target resolution.

Other pels have been similarly added or deleted from the shape of FIG. 4B to arrive at the shape of FIG. 4C. The patterns of five-by-five pels shown in FIGS. 5A and 5B are shown as pattern strings in FIG. 9 as entries 23 and 31, respectively. The patterns of FIG. 5C are shown in FIG. 10 as entry 1.

Figure 9:
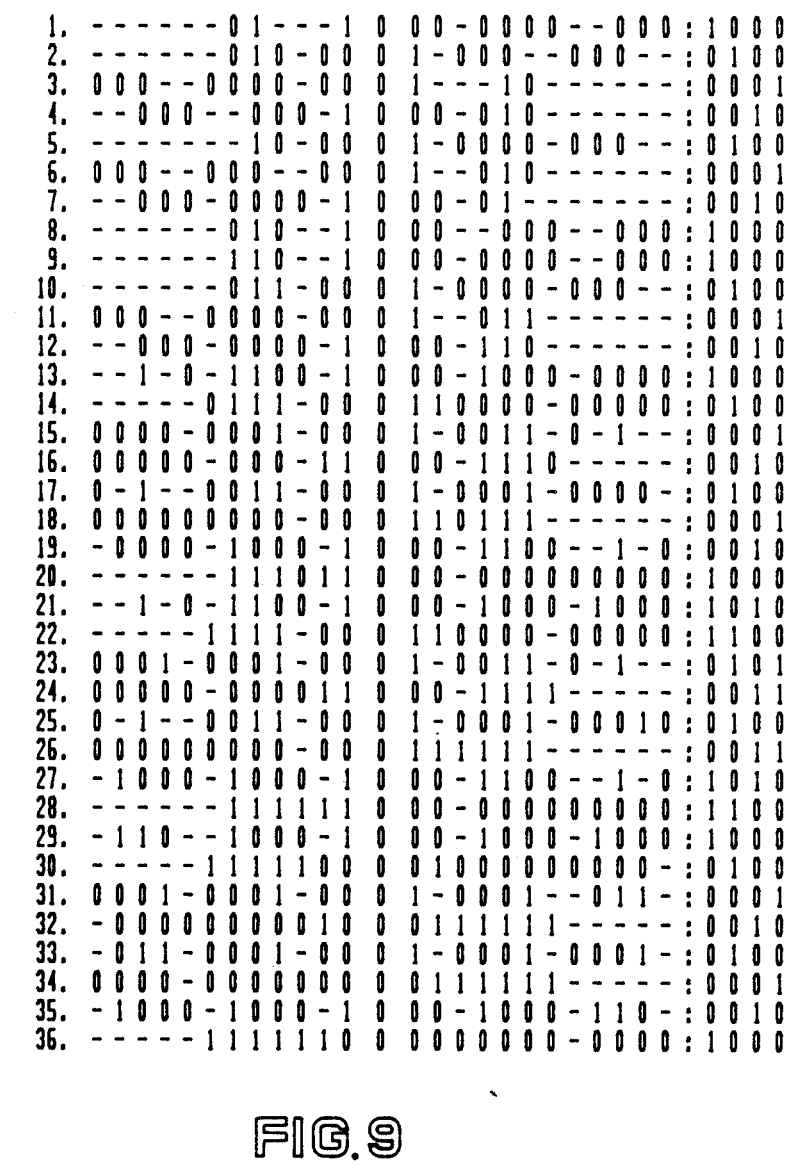

The patterns shown in the tables of FIGS. 9 and 10 can be used to enhance images that include both graphic material and text according to the invention. The table of FIG. 9 is for white IPI's and that of FIG. 8, for black IPI's. The pel corresponding to the IPI is set off by an extra space for purposes of clarity. The associated two-by-two pattern follows the colon at the end of each five-by-five pattern.

Each pel of of the input image string is in turn the input pel of interest (IPI). The data string is the five-by-five grouping around the IPI. Construction of the data string must concatenate the IPI and other 24 pels in the correct order. This is explained in more detail below.

In the following description, references are made to the flowcharts depicting the sequence of operations performed by the program. The symbols used therein are standard flowchart symbols approved by the American National Standards Institute and the International Standards Organization. In the explanation, an operation may be described as being performed by a particular block in the flowchart. This is to be interpreted as meaning that the operations referred to are performed by programming and executing a sequence of instructions that produces the result said to be performed by the described block. The actual instructions used depend on the particular hardware used to implement the invention. Different processors have different instruction sets but the person of ordinary skill in the art is familiar with the instruction set with which he works and can implement the operations set forth in the blocks of the flowchart.

Certain operations are common to all programs such as those referred to as housekeeping. This includes operations such as establishing constants, reserving memory space for variables, and supplying names to subroutines. Calling subroutines include call and link procedures, i.e., establishing the address of the subroutine and supplying the parameters from the calling routine to the called subroutine. These operations are sometimes accomplished using stacks, a section of memory which operates as a last-in-first-out (LIFO) buffer. When an address, operand, instruction, or the like is stored in the stack, the operation is called push. For example, when an operand is to be passed to a subroutine, it is pushed onto the stack., i.e., stored in the buffer. When the subroutine needs the parameter, it is read from the top of the stack by an operation called pop. Since these operations are well known in the art, no special explanations will be made except as necessary for a clear understanding of the invention.

Arrays are referred to in the descriptions of the flowcharts used to describe the preferred embodiment. An array is an ordered arrangement of elements, each of which is separately specified by use of an index. A matrix is an example of an array. In the following description, an A-array contains 25 numbers. These are stored collectively and retrieved for computational purposes. The index referring to a particular element in the array is included in parentheses, e.g., A(J) is a general way of referring to the J-th element. A(1) refers to the first element, A(2) to the second, and so on with A(25) referring to the last element. Elements in two-dimensional arrays have two indices and elements in three-dimensional arrays, three indices. Theoretically, an array can have almost any number of dimensions. Array notation is a short way of specifying the address of the array elements stored in a system's memory. The name of the array determines the base address of the array and the indices are used to compute an offset address to the indicated element.

The characters in a string represent a one-dimensional array and each character is an element in the array. The input image string, denoted by I$, for an 8×16 pel image has 128 characters. The tenth pel, for example, is the tenth character in I$ and is referred to by I$(10).

The individual characters in the data string, D$, and pattern string, P$, are referred to using an index in the same way.

The patterns of FIGS. 9 and 10 are stored as a three-dimensional array called PTBL. The first dimension, having a maximum value of two, is determined by the center pel in the pattern corresponding to the IPI in the data string. If the first dimension has an index value of 1, then the table of FIG. 7, having white center pels) is accessed. If the first dimension index has a value of 2, then the table of FIG. 8, having black center pels, is accessed.

The second index of the PTBL element indicates whether (by a value of 1) that the five-by-five pattern is addressed or (by a value of 2) that the two-by-two replacement pattern is addressed.

The third index of the PTBL element is the pattern number, shown in FIGS. 9 and 10 as the row number.

As an example, the five-by-five pattern of FIG. 5A is denoted as PTBL(1,1,21). The two-by-two pattern of FIG. 5A is denoted by PTBL(1,2,21). The five-by-five pattern of FIG. 5C is denoted as PTBL(2,1,1).

Figure 6:
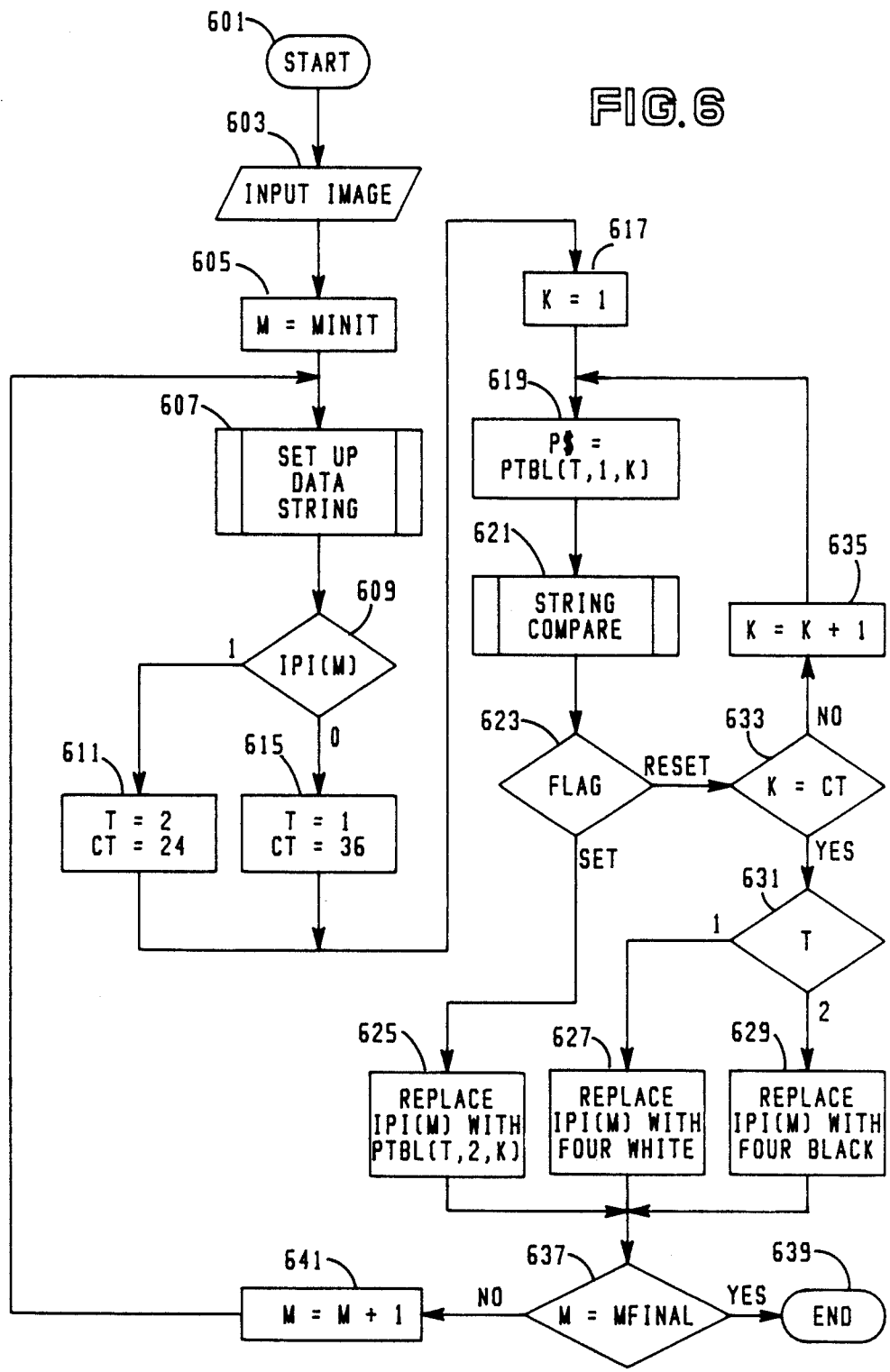
FIG. 6 is flowchart of a computer program for practicing the invention.

FIG. 6 shows the main program for practicing the invention. Although shown as a program module, it would be included as part of a larger program used for printing, e.g., on an all-points-addressable or page printer. The main program uses two subroutines, one to set up the data string 607 and another for the string compare 621. The set up data string subroutine is shown in the flowchart of FIG. 7, and the string compare subroutine 621 is shown in the flowchart of FIG. 8.

Figure 7:
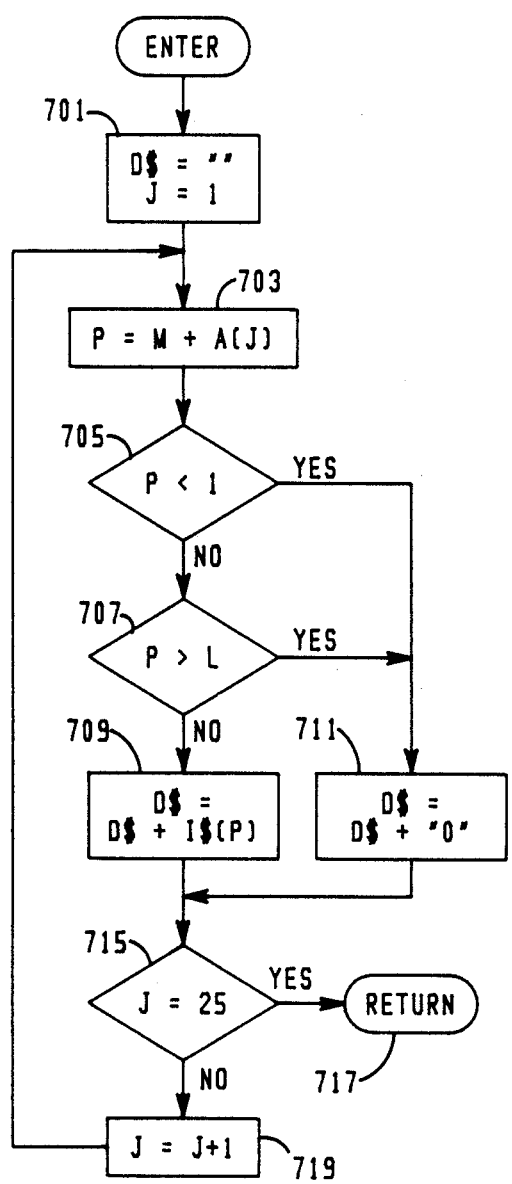
FIG. 7 is a flowchart of a subroutine that composes a data string from the input image information.
Figure 8:
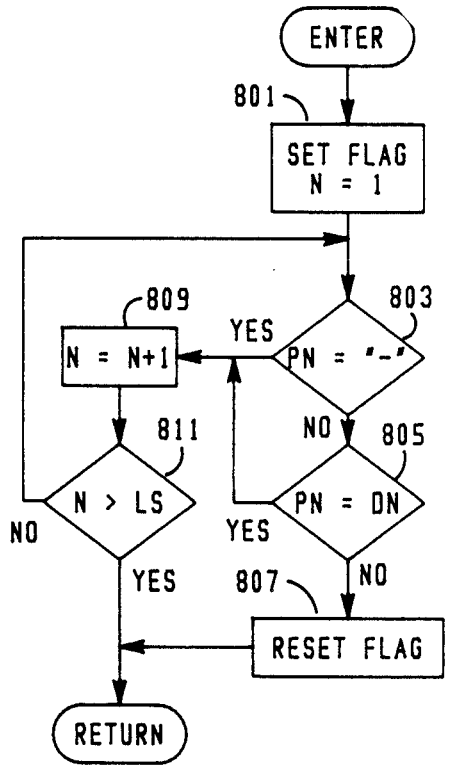
FIG. 8 is a flowchart of a subroutine that compares a data string with a pattern string which includes don't-care values.

The data string subroutine of FIG. 7 is used to create the data string, D$, centered around the input pel of interest. The present input pel of interest is denoted as IPI(M), the M-th pel of I$. The data string includes the 24 pels surrounding IPI(M) to form a string of 25 pels. The data string thus corresponds to five-by-five patterns of the source data.

The subroutine of FIG. 7 begins by setting the data string, D$, to the null string, i.e., "". The null string is a string with no elements. An index counter J is set to 1. These operations are performed by a process block 701.

In a process block 703, an index variable, P, is set to the value of M (one of the values supplied by the calling program of FIG. 6) plus the J-th element of the A-array. The A-array contains 25 values corresponding to the offset of each pel of the data string to form a five-by-five pel array, centered around IPI(M).

The actual values stored in the A-array depend on the size of the field (area of interest) comprising the input image string. In the example shown in FIG. 4A, there are 16 rows of eight pels. Therefore, the first pel of the data string, D$, is two rows above and two columns to the left of the input pel of interest, IPI(M). The first pel of D$ is spaced 18 pels to the left so that the value of A(1), the first element of the A-array is −18.

In the illustrative example being described, the patterns are taken as five-by-five arrays and the area of pels is 8-by-16. For the general case, for patterns u-by-u, u pels on a side where u is usually an odd number, and for c columns, the first entry in the A-array is calculated as $-(u-1)(c+1)/2$. The second element of the A-array would be $1-(u-1)(c+1)/2$.

The elements of the A-array are negative up to the IPI(M) which corresponds to zero in the A-array. The remaining elements in the A-array are symmetrical about the center but have positive values.

The general formula for calculating the $u^2$ values in the A-array is $$t + c(r - 1) - (u - 1)(c + 1)/2$$
$$\text{for } t = 0, 1, \ldots, u - 1, \text{ and}$$
$$r = 1, 2, \ldots, u - 1,$$

where
u = dimension of one side of pattern array,
c = number of pel columns in the image area,
t = column position of A-array, and
r = row position of A-array.

Therefore, the elements of the A-array in the example are as follows:

| | | | | |
|---|---|---|---|---|
| −18 | −17 | −16 | −15 | −14 |
| −10 | −9 | −8 | −7 | −6 |
| −2 | −1 | 0 | +1 | +2 |
| +6 | +7 | +8 | +9 | +10 |

| -continued | | | | |
|---|---|---|---|---|
| +14 | +15 | +16 | +17 | +18 |

When the input pel of interest is the first pel, pels above and to the right do not exist. These pels will be presumed to be white pels. Therefore, in the decision block 705, if the P index is less than 1, then as shown in the process block 711, the data stream, D$, is concatenated with zero, zero representing white pels as described above. Similarly, if the index P is greater than the length L of the input image string (128 in the illustrative example), then as shown in decision block 707, the data string is concatenated with a zero value. If the index P is in the range of available pels in the input image string, then as shown in the process block 709, the data string, D$, is concatenated with the P-th value of the input string I$.

At the completion of the above operations, the value of J is checked to determine whether it is equal to 25 indicating that the data string is complete. If J is not equal to 25, then it is incremented as shown in the process block 719 and the process repeats from the process block 703 as previously described. When 25 characters have been assembled into the data string, D$, then the subroutine is exited at the terminal 717 and execution of the main program resumes.

Comparing the data string, D$, to each of the pattern strings in the correct table requires handling don't-care conditions and is described in conjunction with the flow chart in FIG. 6.

In the process block 801, a flag is set and an index counter N is set to an initial value of 1. This flag indicates that the the data string, D$, and the present pattern string, P$, are equal. If an inequality is found, the flag will be reset as described below.

Next, the decision block 803 checks the nth pel of P$, denoted by PN. If PN is a dash, indicating a don't-care condition, then no further comparison will be necessary. Therefore, as shown in the process block 809, the index N is incremented. In the decision block 811, the value of the index N is compared to LS, the string length, 25 in the embodiment being described. If 25 characters have been compared, then subroutine returns control to the main program. If not, the next character in the pattern is compared to the don't-care condition in the decision block 803.

If the Nth character of the pattern string, P$, is not a don't-care condition, then, as shown in the decision block 805, the Nth characters of the pattern string, P$, and the data string, D$, PN and DN are compared. If the Nth characters are different, then the flag is reset as shown in process block 807 and subroutine is exited. If the Nth characters of the two strings are equal, then N is again incremented and tested for value greater than 25. Therefore, if all the characters of each string are the same except for the don't care situations, then the subroutine will exit without resetting the flag.

With the operation of the subroutines defined, the main program of FIG. 6 will be described. The program is entered at a terminal block 601 which includes any housekeeping operations which may be necessary. An I/O block 603 reads in the input image string. A process block 605 sets M to its initial value, in this case 1. Thereafter, the subroutine 607 sets up the data string as described above.

In a decision block 609, the value of the input pel of interest, IPI(M), is checked. If it represents a black pel, i.e., value of 1, then as shown in a process block 611, a variable T is set to the value 2 indicating that the pattern table is that which centers around a black pel and a count value, CT, is set to 24, the maximum number of entries in the table (of FIG. 10).

In the decision block 609, if the input pel of interest is white, i.e., value of 0, then as shown in a process block 615, the table index T is set to 1 and the count value CT is set to 36.

Next, a index value K is initialized to a value of 1 in a process block 617. The K index is used to step through the pattern table up to the maximum value of the count, CT, previously set.

Then, shown in a process block 619, the pattern string is taken from the pattern table designated PTBL (T,1,K), the value of T being 1 for a white IPI and 2 for a black IPI as previously determined the process blocks 611 or 615. The second index of 1 indicates that the P$ string is the five-by-five array. K indicates the K-th value in the table.

After the strings are compared by the subroutine 621, the flag value is sensed by a decision block 623. If reset, a decision block 633 checks to determine whether K equals the count value CT, indicating that all the patterns have been compared to the data string. If not, the value of K is incremented by a process block 635, and the next pattern from the proper table is accessed and compared to the data string by the subroutine 621. This process continues until the flag is set indicating that the pel of interest and its surrounding pels match the pattern in the pattern table or until the value of K equals the count value indicating that all patterns have been checked. In process blocks 627 and 629, selected by a decision block 631 which tests the value of T, the pel of interest is replaced either with four white pels or with four black pels depending on the value of the input pel of interest. In this case, no enhancement was determined to be desirable.

If, however, the flag is set, then as shown in process block 625 the input pel of interest, IPI, is replaced at the target resolution with the two-by-two array corresponding to the five-by-five array which matched the data stream. The two-by-two array is accessed by the index T, followed by the second index 2 and the third index K. The second index of 2 indicates that it is the two-by-two array which is being accessed. After the IPI has been replaced by the new resolution pels, the value of M is tested in a decision block 637. If the value of M equals MFINAL, in this case 128, then the process ends as shown by a terminal block 639. Otherwise, as shown in a process block 641, the value of M is incremented and a new data string is composed by subroutine 607, followed by the above described procedure.

The invention has been described with respect to five-by-five pel tables representing the pel patterns surrounding the pel of interest. Other configurations are possible, including pel patterns having an even number of sides and where the pel of interest is not necessarily in the center. This can be seen from the pel patterns having rows or columns of don't - care entries.

The implementation, however, of pel patterns having a different number of pels on the side, such as seven or nine, would require additional patterns to those shown in FIGS. 9 and 10. Other aspects of such implementations are covered in this detailed description. For example, the A-array elements can be readily calculated using the formula provided above.

The tables of FIGS. 9 and 10 can be reduced by a factor of approximately eight since they include patterns that are rotations and mirror images of another pattern. It would then, however, be necessary to modify the described method to rotate either each pattern or each data string by 90-, 180-, and 270-degrees. This may be done with a data string, for example, by providing additional A arrays having modified values so that the resulting data string would represent a rotated pattern.

While the invention has been particularly shown and described with reference to a preferred embodiment thereof, it will be understood by those skilled in the art that various changes and modifications in form and details may be made therein without departing from the spirit and scope of the invention according to the following claims.

What is claimed is:

1. A method of enhancing pel images comprising the steps of:
   storing pel patterns representative of pel configurations commonly occurring in one type of image but rarely occurring in another type of image;
   comparing each pel and its surrounding pels of an image to be enhanced to the stored pel patterns; and
   enhancing each pel according to the result of the comparing step by replacing each pel with a plurality of high resolution pels.

2. The method of claim 1 in the replacing step is replacing each pel with a plurality of higher resolution pels, said higher resolution pels associated with a stored pel pattern matching the pel to be replaced and its surrounding pels and being pels of the same value as the pel to be replaced when no matching stored pattern is found.

3. A method to increase resolution to text raster images without affecting halftone raster images comprising the steps of:
   presetting a plurality of patterns occurring in text raster images which do not occur in halftone raster images including the step of:
   selecting patterns centered about a given valued pel having same valued pels in at least one quadrant of said pattern and an immediately adjacent pel of the opposite value in each of the remaining quadrants;
   comparing sections of a raster image to said preset patterns; and
   modifying the center portion of sections of a raster image depending on the result of said comparing step.

4. A method of enhancing pel images of text converted from a lower resolution to a higher resolution by adding or deleting pels at the higher resolution, without degrading accompanying halftone image data, comprising the steps of:
   storing a first set of n-by-n pel patterns at the lower resolution, where n is at least five and said patterns are chosen so as to exclude pel patterns found in halftone images;
   storing a second set of groups of higher resolution pels, each group representing a replacement for a single lower resolution pel and each group associated with a particular one of said patterns in said first set;
   supplying a sequence of pels representing text and images at the lower resolution to be converted to pels representing text and images at the higher resolution;
   selecting each successive pel of the sequence of pels as a pel of interest;
   assembling an n-by-n pel array representing the pels around the pel of interest, said pel of interest being the center pel of the array;
   replacing the pel of interest at the higher resolution with the group of said second set of pels associated with an n-by-n pattern of said first set of pels matching the assembled n-by-n pel array; and
   replacing the pel of interest at the higher resolution with pels of the same value if the assembled n-by-n pel array does not match any pattern in the first set of pels.

* * * * *